United States Patent [19]

Aykut

[11] 4,257,298

[45] Mar. 24, 1981

[54] APPARATUS FOR CUTTING PAPER SHEETS OR THE LIKE

[75] Inventor: Kurt Aykut, Hamburg, Fed. Rep. of Germany

[73] Assignee: E. C. H. Will (GmbH & Co.), Hamburg, Fed. Rep. of Germany

[21] Appl. No.: 38,058

[22] Filed: May 11, 1979

[30] Foreign Application Priority Data

May 19, 1978 [DE] Fed. Rep. of Germany ....... 2821957

[51] Int. Cl.3 .......................... B23D 19/04; B26D 1/24

[52] U.S. Cl. .......................................... 83/482; 83/497; 83/505

[58] Field of Search ................. 83/469, 482, 496, 497, 83/499, 504

[56] References Cited

U.S. PATENT DOCUMENTS

| | | | |
|---|---|---|---|
| 148,203 | 3/1874 | Gardiner | 83/504 |
| 2,180,604 | 11/1939 | Morris | 83/496 |
| 3,186,281 | 6/1965 | Wingen | 83/482 |
| 3,762,259 | 10/1973 | Kuts | 83/482 |

FOREIGN PATENT DOCUMENTS

| | | | |
|---|---|---|---|
| 207472 | 3/1909 | Fed. Rep. of Germany | 83/497 |
| 505135 | 7/1920 | France | 83/497 |

*Primary Examiner*—J. M. Meister
*Assistant Examiner*—K. Bradford Adolphson
*Attorney, Agent, or Firm*—Peter K. Kontler

[57] ABSTRACT

Apparatus for cutting paper sheets wherein a first knife, which is freely rotatable on a shaft, is movable sideways toward and away from a driven counterknife. The shaft is reciprocable in a carrier which is connected with one end of a reciprocable and turnable piston rod. The piston rod extends into a cylinder and is reciprocable by a spring and a membrane-like piston. The orientation of the first knife with respect to the counterknife can be changed by turning the piston rod with reference to the cylinder so that the piston rod can assume and is held in any one of several angular positions. To this end, the piston rod is rigidly connected with a radially extending projection which is disposed between two rollers mounted in the cylinder for movement at right angles to their axes. One of the rollers is biased against one side of the projection by a helical spring, and the other roller is movable at right angles to its axis by an adjusting screw which meshes with the cylinder.

10 Claims, 3 Drawing Figures

APPARATUS FOR CUTTING PAPER SHEETS OR THE LIKE

BACKGROUND OF THE INVENTION

The present invention relates to apparatus for cutting running webs of paper or the like. More particularly, the invention relates to improvements in cutting apparatus of the type wherein a first rotary knife is movable sideways (namely, transversely of its axis of rotation) and axially toward and away from a second rotary knife.

German Auslegeschriften Nos. 1,024,341 and 1,156,635 disclose sheet cutting apparatus wherein a first knife, which is freely rotatable on its shaft, is movable sideways toward and away from a driven rotary counterknife. Once the first knife reaches a position wherein its marginal portion overlies the marginal portion of the counterknife, the first knife is moved axially so that the two marginal portions contact each other and the counterknife transmits torque to the first knife. The apparatus which are disclosed in the aforementioned publications further comprise means for changing the angular position of an elongated guide member which carries the first knife so that the inclination or orientation of the first knife with respect to the counterknife can be adjusted within a certain range. The means for normally holding the guide member against changes in angular position comprises a spring which is mounted in the guide member and extends into a slide bearing wherein the guide member is movable axially to shift the first knife sideways toward or away from the counterknife. The extent of angular play of the guide member with respect to the slide bearing must be minimal in order to insure that the inclination of the first knife with reference to the counterknife does not change while the cutting apparatus is in actual use. On the other hand, a certain amount of play must exist in order to enable the guide member to move the first knife sideways, i.e., to insure that the means for moving the guide member axially need not apply a pronounced force. It has been found that the wear upon the aforementioned spring and/or slide bearing is extensive, i.e., the extent of angular play of the guide increases gradually and often reaches a value at which the inclination of the first knife with respect to the counterknife is excessive.

The slide bearing is held in the selected position by screws which must be loosened in order to allow for changes in angular position of the slide bearing and guide member for the first knife. To this end, the screws extend into elongated slots of the slide bearing. The adjustment is time-consuming and unreliable because, when the screws are tightened again, some shifting of the slide bearing invariably occurs with the result that the final (adjusted) position of the slide bearing (and hence the inclination of the first knife with respect to the counterknife) deviates from the desired optimum position. Moreover, tightening of the screws entails at least some deformation of the material which is engaged by the heads of the screws, and this often suffices to prevent predictable adjustments of inclination of the first knife.

OBJECTS AND SUMMARY OF THE INVENTION

An object of the invention is to provide a novel and improved cutting apparatus wherein the orientation of the first knife with reference to the counterknife can be selected and maintained with a high degree of accuracy and reproducibility.

Another object of the invention is to provide a cutting apparaus wherein the means for moving the first knife with reference to the counterknife can include small, simple and inexpensive motors whose energy requirements are negligible.

A further object of the invention is to provide a cutting apparatus wherein the orientation of the first knife can be selected and/or changed while the apparaus is in actual use and without resorting to special tools or like implements.

An additional object of the invention is to provide an apparatus wherein the orientation or inclination of the first knife with reference to the counterknife can be selected and adjusted by skilled, semiskilled or even unskilled attendants and which can be installed in existing machines for the processing of paper sheets, e.g., in machines for assembling pads or the like by subdividing large sheets into smaller sheets and for stacking the smaller sheets on top of each other.

Another object of the invention is to provide the cutting apparatus with orienting means which is less affected by wear upon its parts than conventional orienting means.

A further object of the invention is to provide the cutting apparatus with means for orienting the first knife with reference to the counterknife in such a way that the orientation of the first knife remains unchanged at all times unless an attendant decides to change such orientation.

An additional object of the invention is to provide orienting means which is readily accessible for inspection, repair and/or replacement of its components.

The invention is embodied in a cutting apparatus for paper sheets or the like. The apparatus comprises a first knife which is rotatable about a first axis and preferably constitutes a flat disk which is freely rotatable on a shaft, a second rotary knife or counterknife which is preferably driven by a prime mover and can transmit torque to the first knife when the marginal portion of the first knife is caused to contact the second knife, means for moving the first knife sideways toward and away from the second knife including an elongated piston rod or an analogous guide member which is rigidly connected with a carrier for the shaft of the first knife and is turnable between a plurality of positions about a second axis which is substantially normal to the first axis to thereby change the orientation (inclination) of the first knife with reference to the second knife, and a pneumatic motor or other suitable means for reciprocating the guide member in the direction of the second axis (preferably in combination with a spring which tends to move the first knife sideways and away from the second knife), and orienting means for maintaining the guide member in a selected one of the aforementioned plurality of positions. The orienting means comprises first abutment means (e.g., a flat plate-like projection rigid with and extending radially from the guide member) which is turnable with the guide member about the second axis, a spring or other suitable means for applying torque to the guide member and to the first abutment means in a direction to turn the guide member and the first abutment means about the second axis, a roller or other suitable second abutment means which is located in the path of movement of the first abutment means under the action of the torque applying means, and means for adjusting the position of at least one of the abutment means relative to the other abutment means to thereby effect the movement of the guide member from one to another of the aforementioned plurality of positions. The adjusting means may comprise a screw which meshes with a support wherein the guide member reciprocates and which can move the aforementioned roller substantially transversely of the first abutment means.

The novel features which are considered as characteristic of the invention are set forth in particular in the appended claims. The improved cutting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
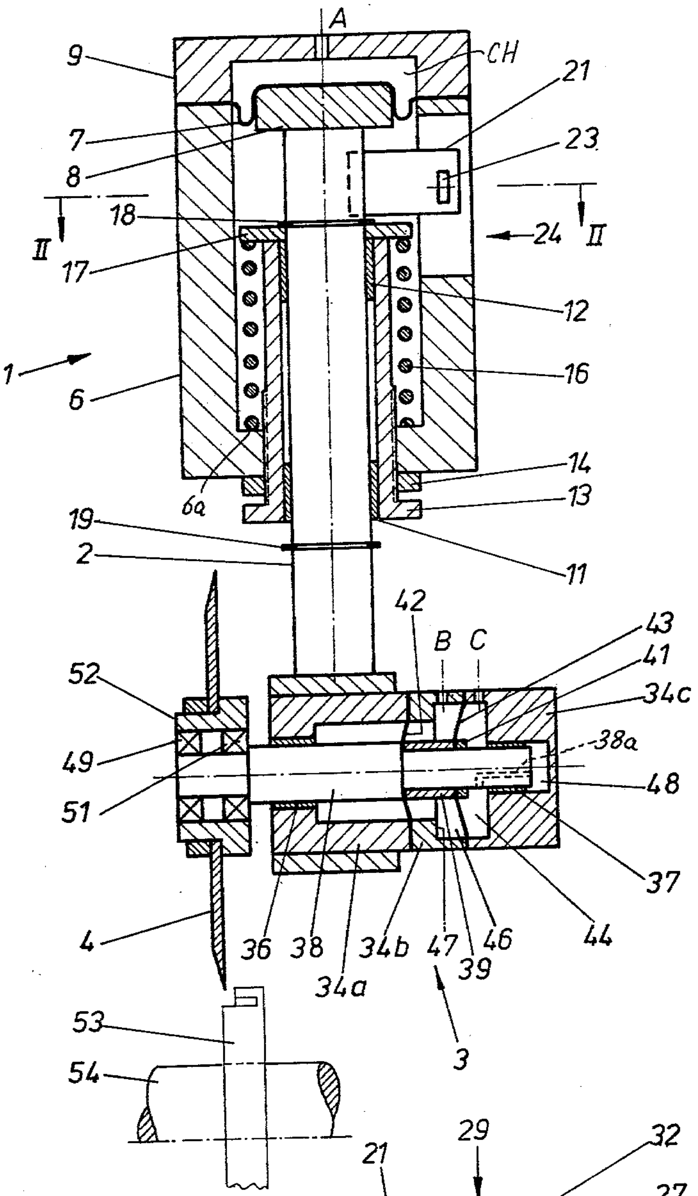
FIG. 1 is an axial sectional view of the apparatus, with the first knife located in its lower end position.
Figure 2:
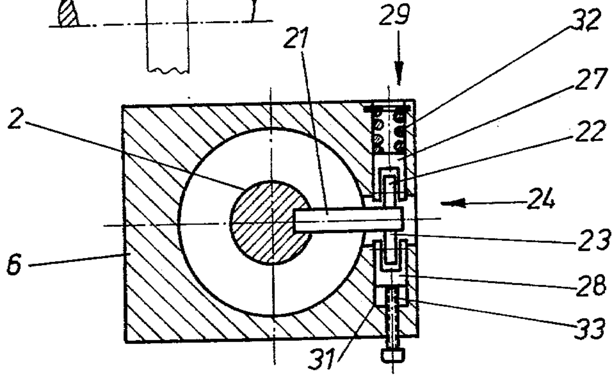
FIG. 2 is a sectional view as seen in the direction of arrows from the line II—II of FIG. 1.

The cutting apparatus which is shown in FIGS. 1 and 2 comprises a holder 1 for an elongated rod-shaped guide member here shown as a reciprocable piston rod 2 the exposed end portion of which is connected with a carrier 3 for a rotary disk-shaped knife 4, the latter being rotatable about the (first) axis of a shaft 38 forming part of the carrier 3. The holder 1 includes a cylinder 6 forming part of a first fluid-operated motor which can move the carrier 3 axially of the guide member 2 from an upper to a lower end position. The inner end portion or head 8 of the guide member 2 is overlapped by a deformable piston 7, here shown as a flexible membrane, whose marginal portion is clamped between a cover member 9 of the holder 1 and the adjacent end face of the cylinder 6. The cover member 9 has a port A for admission of a pressurized fluid into a chamber CH between the internal surface of the cover and the upper side of the membrane 7.

The guide member 2 is reciprocable in two friction bearings 11, 12 which are installed in the cylinder 6 in the interior of an elongated cylindrical sleeve 13. The latter has external threads which mate with the internal threads in the lower end portion of the cylinder 6, as viewed in FIG. 1. A lock nut 14 maintains the sleeve 13 in selected axial position with respect to the cylinder 6. A helical spring 16 reacts against an internal shoulder **6*a* of the cylinder 6 and bears against a disk 17 which surrounds the guide member 2 and abuts against a stop 18 here shown as a split ring which is recessed into a circumferential groove of the member 2. The spring 16 urges the guide member 2 axially in a direction to move the carrier 3 toward the cylinder 6, i.e., to shift the carrier 3 to the upper end position and to thereby reduce the volume of the chamber CH. A second stop 19 (here shown as a split ring which is recessed into a circumferential groove of the guide member 2) limits the extent of movement of the guide member under the action of the spring 16, i.e., the stop 19 determines the upper end position of the carrier 3. When the guide member 2 reaches the inner end position, the stop 19 abuts against the adjacent end face of the sleeve 13. FIG. 1 shows the carrier 3 in the lower end position in which the disk 17 abuts against the upper end face of the sleeve 13 and the stop 19** is remote from the lower end of the sleeve. The chamber CH is filled with pressurized fluid.

The orienting means for maintaining the guide member 2, which is rotatable about its (second) axis, in any one of a plurality of angular positions with reference to the cylinder 6 comprises a flat radial projection 21 (first abutment means) which is installed in the member 2 adjacent to the head 8 and extends into a slot 24 of the cylinder 6. The outer portion of the projection 21 is disposed between a first roller 22 and a second roller (second abutment means) 23. The rollers 22, 23 are mounted in the cylinder 6, i.e., the cylinder 6 can be said to constitute a support for the rollers. The rollers 22 and 23 are respectively rotatable in bifurcated bearing members 27, 28 which are reciprocable in sockets 29 and 31 extending from the slot 24 and into the cylinder 6. The axes of the sockets 29 and 31 are normal or nearly normal to the plane of the projection 21. The bearing member 27 for the roller 22 is biased toward the projection 21 by a helical spring 32 which is installed in the innermost portion of the socket 29, i.e., the spring 32 applies torque tending to turn the guide member 2 and the projection 21 in a clockwise direction, as viewed in FIG. 2. The bearing member 28 in the socket 31 is adjustable by a screw 33 which meshes with the cylinder 6 and whose head is accessible at the exterior of the holder 1. Thus, the axial position of the adjusting screw 33 determines the orientation of the guide member 2 with respect to the cylinder 6, i.e., the inclination of the knife 4.

The carrier 3 is a cylindrical body which is assembled of sections **34*a*, 34*b* and 34*c*. The sections 34*a* and 34*c* respectively contain friction bearings 36, 37 for the aforementioned shaft 38 which is reciprocable with the knife 4 at right angles to the axis of the guide member 2. The shaft 38 carries clamping sleeves, including those shown at 39 and 41, which serve to clamp the median portions of annular membranes 42 and 43. The marginal portions of the membranes 42 and 43 are respectively clamped between the sections 34*a*, 34*b* and 34*b*, 34*c*. The membrane 43 divides the interior of the carrier 3 into compartments 44 and 46 and constitutes a deformable piston which cooperates with the cylinder including the sections 34*a*–34*c* to move the shaft 38 axially. The exposed (effective) area of the membrane 42 is smaller than that of the membrane 43 because the inner diameter of the section 34*a* is smaller than that of the section 34*c* (the cylindrical portion of the section 34*a* which extends inwardly beyond the internal surface of the section 34*c* is shown at 47). The purpose of the membrane 42 is to seal the compartment 46 from the space between the shaft 38 and the internal surface of the section 34*a*, i.e., to prevent escape of fluid from the compartment 46 toward the friction bearing 36. Sealing of the right-hand side of the compartment 44 (as viewed in FIG. 1) is not necessary because the friction bearing 37 is installed in a blind bore 48 of the section 34*c*. The shaft 38 is formed with one or more channels 38*a* which equalize the pressure in the blind bore 48 and the compartment 44**.

The section **34*b* has a port B which communicates with the compartment 46, and the section 34*c* has a port C which communicates with the compartment 44**.

That end portion of the shaft 38 which extends outwardly beyond the section 34*a* of the cylinder 34*a*–34*c* is surrounded by antifriction bearings 49, 51 for the hub 52 of the knife 4. The hub 52 is rigidly (preferably separably) connected with the knife 4 but is free to rotate with respect to the shaft 38. A second knife or counterknife 53 is mounted on a rotary drive shaft 54 adjacent to the path of axial movement of the knife 4 with the shaft 38. The means for driving the shaft 54 for the counterknife 53 comprises a suitable motor, not shown.

The shaft 38 constitutes the piston rod of a second fluid-operated motor, namely, of a double-acting pneumatic cylinder and piston unit whose cylinder is constituted by the sections 34*a*–34*c* of the carrier 3 and whose piston is the membrane 43.

Figure 3:
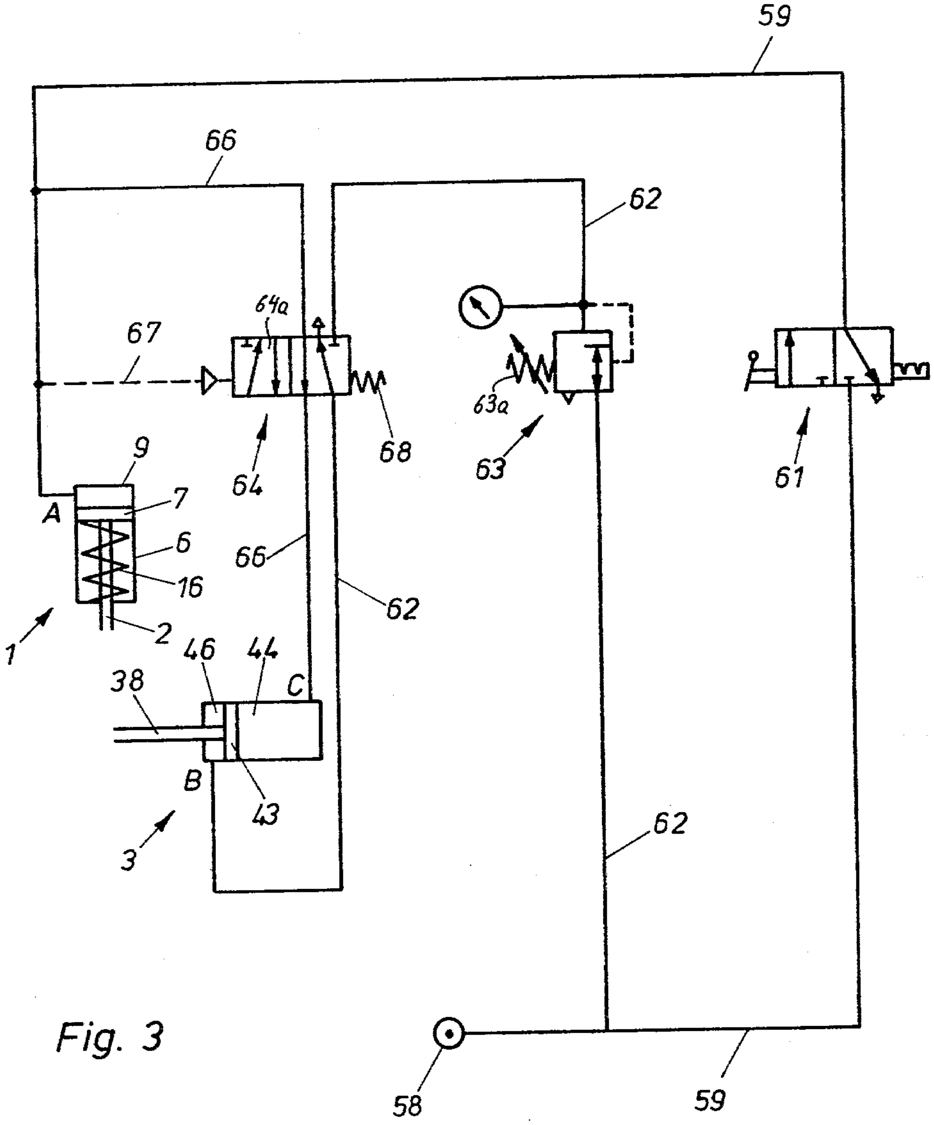
FIG. 3 is a diagram of the fluid-operated control system of the apparatus.

FIG. 3 shows schematically the holder 1, the carrier 3 and the elements of the pneumatic control circuit in the improved cutting apparatus. The control circuit comprises a source 58 of pressurized fluid (e.g., a source of compressed air) which is connected with the port A of the cover member 9 by a first conduit 59 containing a shutoff valve 61. The outlet of the source 58 is further connected with a second conduit 62 (which may but need not branch off the conduit 59 upstream of the valve 61) serving to supply pressurized fluid to the port B of the section 34*b*. The conduit 62 contains an adjustable pressure requlating valve 63 and a four-way valve 64. A third conduit 66, which is connected with the source 58 via first conduit 59 downstream of the shutoff valve 61, can admit pressurized fluid to the port C of the section 34*c* via valve 64. The valving element 64*a* of the valve 64 can be shifted by pressurized fluid via control line 67 which branches off the conduit 59 and is indicated by a broken line. The control line 67 communicates with the conduit 59 downstream of the valve 61. The valve 64 further comprises a spring 68 which yieldably biases the valving element 64*a* to the illustrated (first) position in which the source 58 is sealed from the port B but can admit pressurized fluid to the port C when the valve 61 is open. The spring 68 yields when the pressure in the control line 67 rises to a predetermined value, i.e., when the motor including the cylinder 6, piston or membrane 7 and the guide member or piston rod 2 has completed the movement of the carrier 3 to the lower end position in which the marginal portion of the knife 4 overlaps the marginal portion of the counterknife 53. It can be said that the valve 64 constitutes a threshold member which can admit pressurized fluid to the port C or to the port B (i.e., to the one or the other side of the membrane or piston 43) depending upon whether the pressure in the conduit 59 is above or below the aforementioned predetermined value. In its second position, the valving element 64*a* connects the port C with the atmosphere and allows pressurized fluid to flow into the port B.

The operation is as follows:

The valve 61 is actuatable by hand. When the attendant opens the valve 61 to admit pressurized fluid into the port A, the chamber CH is filled with fluid and the membrane (piston) 7 moves the guide member 2 axially downwardly, as viewed in FIG. 1, i.e., against the opposition of the spring 16. The conduit 59 further admits pressurized fluid into the conduit 66 and thence into the compartment 44 of the carrier 3 via port C. Thus, as the guide member 2 moves downwardly (as viewed in FIG. 1), the knife 4 is caused to move to its outer end position remote from the counterknife 53. In other words, when the knife 4 moves toward the drive shaft 54, it is invariably spaced apart from the counterknife 53.

While the guide member 2 moves against the opposition of the spring 16, its projection 21 (first abutment means) rotates the rollers 22 and 23 whereby the torque applying spring 32 insures that the selected angular position (orientation) of the guide member with respect to the cylinder 6 remains unchanged, i.e., the bearing member 28 for the roller 23 (second abutment means) bears against the adjusting screw 33. In other words, the guide member 2 reciprocates without any angular play. The axial movement of the guide member 2 in a direction to move the knife 4 toward the drive shaft 54 is terminated when the stop 17 reaches and abuts against the inner end face of the sleeve 13. As mentioned above, the sleeve 13 meshes with the cylinder 6, i.e., its axial position can be adjusted (and fixed by the lock nut 14) in such a way that the attendant can select the extent of overlap between the marginal portions of the knife 4 and counterknife 53.

When the guide member 2 reaches its fully extended position, the pressure in the conduit 59 rises with attendant rise of fluid pressure in the control line 67. Therefore, the valving element 64*a* of the valve 64 is shifted against the opposition of the spring 68 and the valve 64 connects the conduit 59 with the port B (via conduit 62) while simultaneously disconnecting the source 58 from the port C. The port B receives pressurized fluid via pressure regulating valve 63 in the conduit 62, and such fluid fills the compartment 46 to move the shaft 38 to the retracted position whereby the marginal portion of the knife 4 moves toward the counterknife 53. The shaft 38 is displaced by the membrane (piston) 43. At the same time, fluid which fills the compartment 44 is free to escape to the atmosphere via port C and valve 64.

The adjustment of the pressure regulating valve 63 is preferably such that the movement of the knife 4 toward the counterknife 53 takes place gradually and that the marginal portion of the knife 4 bears against the marginal portion of the counterknife 53 with a preselected force which can be varied by adjusting the bias of the spring 63*a* forming part of the pressure regulating valve 63. Once the knife 4 bears against the counterknife 53, it rotates the hub 52 with respect to the shaft 38 as soon as the motor for the drive shaft 54 is started.

The valve or threshold member 64 insures that the knife 4 is moved axially toward the counterknife 53 only when the pressure in the conduit 59 rises to the predetermined value, i.e., when the carrier 3 assumes its lower end position. This valve can be replaced by two components, namely, a valve and a threshold member; however, the illustrated structure wherein the valve 64 constitutes a threshold member is preferred owing to greater simplicity and lower cost of the control circuit. Since the compartment 44 receives pressurized fluid as soon as the valve 61 opens, the knife 4 cannot strike against the counterknife 53 while the carrier 3 moves to its lower end position. Thus, the knife 4 is held at a distance from the counterknife 53 (as considered in the axial direction of the shaft 38) while the motor including the cylinder 6 moves the carrier 3 to its lower end position.

The knife 4 need not and preferably should not wobble with respect to the shaft 38. In order to insure that the shaft 38 can move axially (if necessary) while the knife 4 bears against the counterknife 53, the piston 43 is a yieldable membrane which urges the shaft 38 in a direction to maintain the knife 4 in contact with the knife 53 as long as the compartment 46 receives pressurized fluid via valve 64, i.e., when the pressure of fluid in the conduit 59 rises to the predetermined value. The pressure regulating valve 63 insures that the knife 4 does not bear against the knife 53 with an excessive force.

By changing the axial position of the adjusting screw 33, an attendant can change the orientation (inclination) of the knife 4 with respect to the counterknife 53 with a very high degree of precision. Once the axial position of the screw 33 is changed, the angular position of the guide member 2 remains unchanged because the spring 32 causes the roller 22 to urge the projection 21 of the guide member 2 against the adjacent portion of the peripheral surface of the roller 23.

If the knife 4 is to be returned to the idle position, the attendant closes the valve 61 to seal the port A from the source 58 and to permit pressurized fluid to escape from the chamber CH via valve 61. The spring 16 is then free to expand and to move the stop 19 against the adjacent end face of the sleeve 13. At the same time, the spring 68 returns the valving element of the valve 64 to its first position in which the compartment 46 is free to communicate with the atmosphere. This reduces the pressure between the marginal portions of the knives 4 and 53.

A machine wherein the improved cutting apparatus can be put to use is disclosed, for example, in U.S. Pat. No. 4,157,821 granted June 12, 1979 on application Ser. No. 854,835 filed Nov. 25, 1977 by Paul Fabrig. The machine normally comprises an entire battery of coaxial knives 4 which are movable with respect to associated counterknives. Such battery can subdivide a wide web into several strips which are thereupon severed by a transverse cutter to yield files of discrete sheets having a desired size and/or shape.

An important advantage of the improved apparatus is that the guide member 2 invariably remains in the selected one of several angular positions for any desired period of time, i.e., until intentionally adjusted by an attendant who rotates the screw 33 in order to turn the projection 21 against the opposition of the spring 32 or to enable the spring 32 to turn the projection 21 (and hence the guide member 2) in a clockwise direction, as viewed in FIG. 2. Moreover, the screw 33 enables an attendant to change the orientation of the knife 4 relative to the counterknife 53 while the cutting apparatus is in actual use, and the adjustment is not only precise but also simple and rapid. When the apparatus is in use, the spring 32 insures that the angular position of the guide member 2 remains unchanged, i.e., the projection 21 is held between the rollers 22 and 23 without any play.

The rollers 22 and 23 enable the projection 21 to move in parallelism with the axis of the guide member 2 with a minimum of friction. Thus, the energy requirements of the motor including the cylinder or support 6 and the membrane or piston 7 are not increased (or are increased only negligibly) due to the fact that the roller 22 is biased against the respective side of the projection 21.

It is presently preferred to rigidly connect the projection 21 with the guide member 2 and to make one of the rollers 22, 23 adjustable in a direction substantially transversely of the projection 21. This is desirable because the screw 33 for adjustment of the roller 23 is readily accessible at the exterior of the cylinder 6. However, it is also within the purview of the invention to provide means for adjusting the projection 21 with reference to the guide member 2, e.g., by mounting the projection on a hinge and by providing means for changing the inclination of the projection with reference to the guide member 2. It is also within the purview of the invention to provide adjustable abutment means on the guide member 2 and to further provide adjustable abutment means (such as the roller 23) in the cylinder or support 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In an apparatus for cutting paper sheets or the like, the combination of a first knife rotatable about a first axis; a second rotary knife; carrier means rotatably mounting said first knife; means for moving said first knife transversely of said axis toward and away from said second knife including a guide member connected with said carrier means and turnable between a plurality of positions about a second axis which is substantially normal to said first axis, and means for reciprocating said guide member in the direction of said second axis; and orienting means for maintaining said guide member in a selected one of said plurality of positions, including first abutment means turnable with said guide member about said second axis, means for continuously applying torque to said guide member and to said first abutment means in a direction to turn said guide member about said second axis, second abutment means located in the path of movement of said first abutment means under the action of said torque applying means, and means for adjusting the position of at least one of said abutment means with reference to the other of said abutment means to thereby effect the movement of said guide member from one to another of said plurality of positions.

2. The combination of claim 1, wherein said one abutment means is said second abutment means.

3. The combination of claim 1, further comprising means for reciprocating said first knife in the direction of said first axis.

4. In an apparatus for cutting paper sheets or the like, the combination of a first knife rotatable about a first axis; a second rotary knife; carrier means rotatably mounting said first knife; means for moving said first knife transversely of said axis toward and away from said second knife including a guide member connected with said carrier means and turnable between a plurality of positions about a second axis which is substantially normal to said first axis, and means for reciprocating said guide member in the direction of said second axis; and orienting means for maintaining said guide member in a selected one of a plurality of positions, including first abutment means which comprises a projection extending laterally from said guide member and turnable with said guide member about said second axis, means for applying torque to said guide member and to said first abutment means in a direction to turn said guide member about said second axis, second abutment means comprising a roller located in the path of movement of said first abutment means under the action of said torque applying means, and means for adjusting the position of at least said second abutment means with reference to said first abutment means to thereby effect the movement of said guide member from one to another of said plurality of positions, said adjusting means comprising means for moving said roller substantially transversely of said projection.

5. The combination of claim 4, further comprising a second roller, said projection being disposed between said rollers and said torque applying means including means for biasing said second roller against said projection.

6. The combination of claim 5, wherein said projection is rigidly connected with said guide member.

7. The combination of claim 6, further comprising a stationary support, said rollers being movably installed in said support and being movable substantially at right angles to their respective axes.

8. The combination of claim 7, further comprising bearing members rotatably supporting said rollers, each of said bearing members being reciprocable in said support at right angles to the axis of the respective roller, said biasing means comprising a spring installed in said support and arranged to urge the bearing member for said second roller toward said projection.

9. The combination of claim 8, wherein said means for moving said first mentioned roller substantially transversely of said projection comprises a device for moving the bearing member for said first mentioned roller with respect to said support.

10. The combination of claim 9, wherein said device includes an externally threaded element meshing with said support.

* * * * *